(12) United States Patent
Graczyk et al.

(10) Patent No.: US 8,736,829 B2
(45) Date of Patent: *May 27, 2014

(54) DIRECTIONAL BEACON DEVICE

(75) Inventors: Ronald C. Graczyk, Cedar Park, TX (US); Michael R. Primm, Austin, TX (US); Dale Parvey, Austin, TX (US); Ryan D. Joy, Austin, TX (US); Chris C. Gaskins, Austin, TX (US)

(73) Assignee: RF Code, Inc., Austin, TX (US)

( * ) Notice: Subject to any disclaimer, the term of this patent is extended or adjusted under 35 U.S.C. 154(b) by 117 days.

This patent is subject to a terminal disclaimer.

(21) Appl. No.: 13/360,101

(22) Filed: Jan. 27, 2012

(65) Prior Publication Data
US 2012/0119680 A1 May 17, 2012

Related U.S. Application Data

(63) Continuation of application No. 12/688,643, filed on Jan. 15, 2010, now Pat. No. 8,144,056.

(60) Provisional application No. 61/145,385, filed on Jan. 16, 2009.

(51) Int. Cl.
*G01B 11/26* (2006.01)

(52) U.S. Cl.
USPC .................................................. 356/139.01

(58) Field of Classification Search
USPC .................. 356/3.01–28.5, 139.01–139.1
See application file for complete search history.

(56) References Cited

U.S. PATENT DOCUMENTS

| | | |
|---|---|---|
| 2,441,877 A | 5/1948 | Flett |
| 2,740,103 A * | 3/1956 | Gosswiller ............... 340/815.74 |
| 3,662,180 A | 5/1972 | Jorgensen et al. |
| 3,851,165 A | 11/1974 | Beck et al. |
| 5,694,112 A | 12/1997 | VannRox et al. |
| 5,734,752 A | 3/1998 | Knox et al. |
| 6,833,718 B1 | 12/2004 | Bethke et al. |
| 7,097,106 B2 | 8/2006 | Silverbrook et al. |
| 7,555,383 B2 | 6/2009 | Siegel |
| 7,692,125 B1 | 4/2010 | Williams |
| 7,791,497 B2 | 9/2010 | Clerk |
| 8,144,056 B2 * | 3/2012 | Graczyk et al. ............... 342/386 |
| 2003/0144791 A1 | 7/2003 | Burg et al. |
| 2004/0195334 A1 | 10/2004 | Silverbrook et al. |
| 2006/0032922 A1 | 2/2006 | Philyaw et al. |
| 2006/0071085 A1 | 4/2006 | Philyaw et al. |

(Continued)

FOREIGN PATENT DOCUMENTS

| | | | |
|---|---|---|---|
| JP | 2001-0228238 A | | 8/2001 |
| KR | 10-0445242 B1 | | 8/2004 |
| WO | 2005/067608 A2 | | 7/2005 |
| WO | 2008/086616 A1 | | 7/2008 |

*Primary Examiner* — Luke Ratcliffe

(74) *Attorney, Agent, or Firm* — Larson Newman, LLP

(57) ABSTRACT

A beacon device includes a control circuitry, a window, and a plurality of sets of illumination sources. The window includes a prismatic structure forming a ring from a planar perspective. The prismatic structure defines an inside surface and an outside surface from the planar perspective. The plurality of sets of illumination sources are coupled to the control circuitry. Each set of illumination sources includes a first illumination source disposed proximal to the inside surface of the prismatic structure and includes a second illumination source disposed proximal to the outside surface of the prismatic structure. The control circuitry is to illuminate a first set of the plurality of sets of illumination sources to transmit a signal in a first direction.

11 Claims, 5 Drawing Sheets

(56) References Cited

U.S. PATENT DOCUMENTS

| | | |
|---|---|---|
| 2006/0237546 A1 | 10/2006 | Lapstun et al. |
| 2007/0229391 A1 | 10/2007 | Fujii et al. |
| 2008/0144186 A1 | 6/2008 | Feng et al. |
| 2008/0163504 A1 | 7/2008 | Smith et al. |
| 2010/0214163 A1 | 8/2010 | Nichols et al. |
| 2011/0128129 A1 | 6/2011 | Graczyk et al. |

* cited by examiner

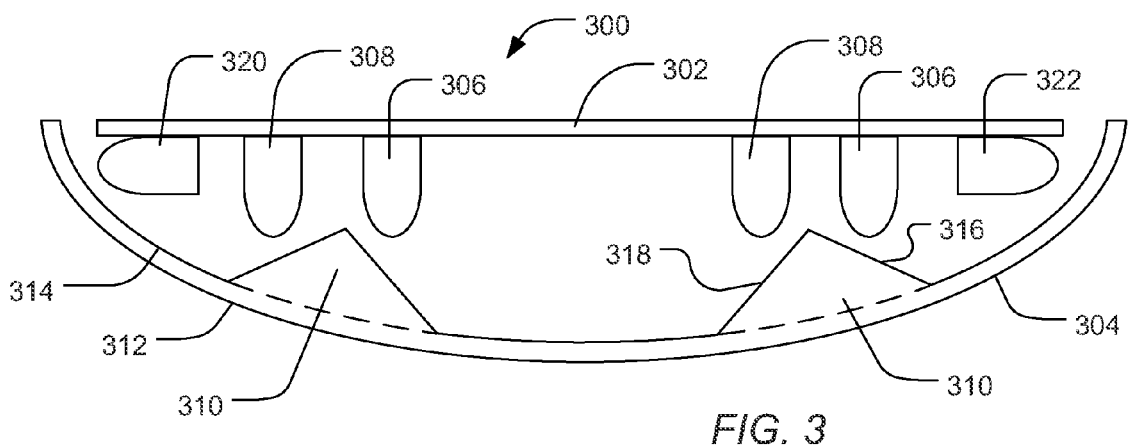
FIG. 3
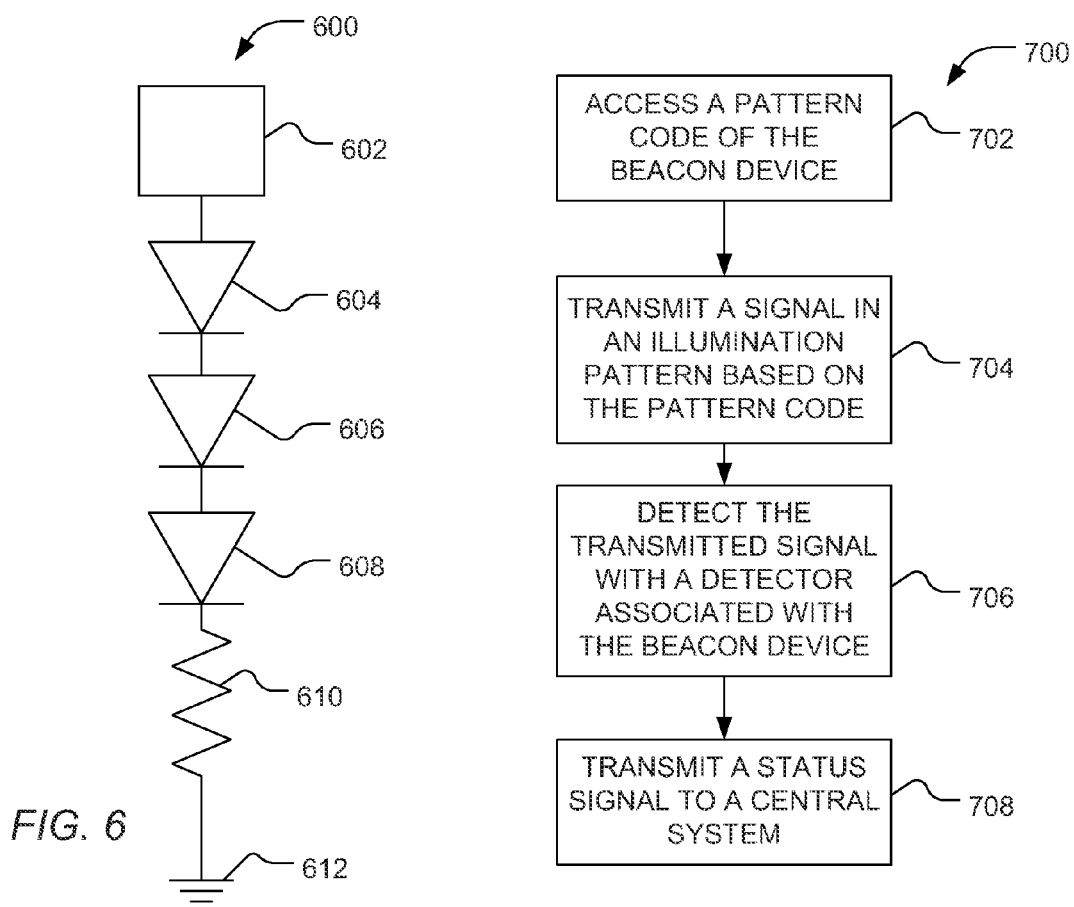
FIG. 6
FIG. 7

DIRECTIONAL BEACON DEVICE

CORRESPONDING APPLICATIONS

This application is a continuation of U.S. patent application Ser. No. 12/688,643, entitled "Directional Beacon Device," filed on Jan. 15, 2010, which claims priority U.S. Provisional Pat. Application No. 61/145,385, entitled "Directional Beacon Device," filed on Jan. 16, 2009, the disclosures of which are hereby expressly incorporated by reference in its entirety.

FIELD OF THE DISCLOSURE

This disclosure, in general, relates to directional beacon devices.

BACKGROUND

With the increasing complexity of commercial organizations, industry is seeking to track the location and use of inventory and equipment with increasing specificity and detail. For example, a wholesaler can track the location and availability of inventory within warehouses. Such tracking permits increased automation of inventory systems and provides more accurate data for use in supply chain management. In another example, organizations can use tracking systems to determine the location and use of equipment. For example, a hospital can track the location or use of equipment within patients' rooms. Such data can be used to locate equipment in large facilities or can be used to accurately bill for the use of the equipment by patients.

Traditionally, tracking systems use an infrared beacon or communicate with tracking devices using infrared signals. However, conventional systems often interfere with the operation of other equipment and are subject to interference from other infrared sources, such as artificial light or sunlight projecting through windows. For example, conventional systems tend to interfere with the operation of remote controls, such as television and VCR remote controls. At times, conventional systems exhibit problems associated with interference between beacons, resulting in a false indication of equipment location.

Accordingly, an improved tracking system would be desirable.

BRIEF DESCRIPTION OF THE DRAWINGS

The present disclosure may be better understood, and its numerous features and advantages made apparent to those skilled in the art by referencing the accompanying drawings.

FIG. 3, FIG. 4, and FIG. 5 include illustrations of an exemplary beacon device.

FIG. 6 includes an illustration of an exemplary circuitry.

FIG. 7 includes a flow diagram of an exemplary method for transmitting a beacon.

The use of the same reference symbols in different drawings indicates similar or identical items.

DESCRIPTION OF THE DRAWINGS

In a particular embodiment, a tracking system includes a beacon device and a tag. The beacon device communicates with the tag to assist a tracking system in determining the location of the tag. For example, the tracking system can also include an RF antenna coupled to a central system. The beacon device communicates a location to the tag and the tag communicates its location to the central system via the RF antenna. In this manner, the central system can determine the location of the tag and thereby, the location of equipment or inventory associated with the tag. In a particular example, the beacon device includes a set of illumination sources disposed in proximity to a prismatic structure. Selective illumination of subsets of the illumination sources results in transmission of a signal in a designated direction. In particular, the beacon device can include a pattern code that is used to determine which of the illuminating sources are to be used in transmitting the signal.

In another embodiment, a tracking system is configured by installing a beacon device and providing the beacon device with a pattern code with which the beacon device determines which of a plurality of illumination sources to activate when transmitting a signal. In addition, the beacon device can be provided with a location code. In operation, the beacon device can access the pattern code to determine which illumination sources to use when transmitting a signal and can transmit a signal that includes the location code to be received by a tag.

Figure 1:
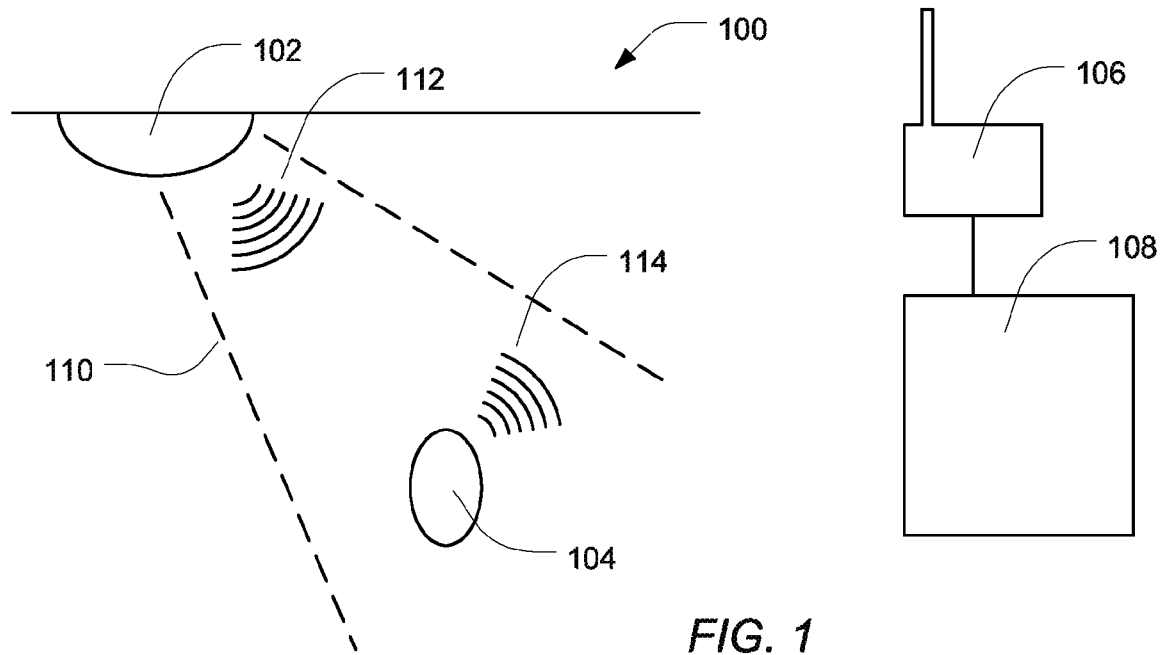
FIG. 1 includes an illustration of an exemplary tracking system.

As illustrated in FIG. 1, a tracking system 100 can include a beacon device 102 and a tag 104. The beacon device 102 can communicate a location to the tag 104. For example, the beacon device 102 can communicate with the tag 104 via a wireless communication method, such as communicating using infrared electromagnetic (IR) signals or radio frequency electromagnetic (RF) signals. In an example, the beacon device 102 can communicate with the tag 104 using IR signals. In particular, the beacon device 102 provides a signal 112 to be received by the tag 104 in a particular direction 110 at the exclusion of another direction. While some of the signal may spread or reflect into the excluded area, exclusion is intended to indicate a reduction in signal strength of at least 50%, such as at least 75%, at least 90%, at least 95%, at least 99%, or even at least 99.9%.

For example, the beacon device 102 can be located within a room that also includes other equipment communicating with infrared signals. In another example, the room can include windows. Accordingly, the beacon device 102 can be configured to project signals 112 in directions away from the receivers of other equipment that communicate using IR signals or in directions away from windows of the room.

In a further example, the beacon device 102 can be located within a facility that is free of barriers to infrared signals, such as free of walled structures. In such an environment, partitioning of the facility into regions can be accomplished by using directional beacons. For example, a beacon device, such as beacon device 102, can be configured to direct a signal that includes a location code towards a designated region. Another beacon device can be configured to direct a different signal including a different location code toward a different region. Alternatively, the same beacon device, such as beacon device 102, can be configured to direct a signal including a first location code toward a first region and to communicate a signal including a second location code toward a second region.

In a particular embodiment, the beacon device 102 communicates with the tag 104 using an IR signal. The tag 104 receives the signal 112 and may determine a location based on the signal. For example, the signal 112 can include a location code associated with the beacon device 102. In another example, the signal 112 can include other payload data, such as sensor data. In a particular example, the signal 112 can include payload data, such as temperature, telemetry, oxygen level, pressure, or other sensor data. The tag 104 communicates with a central system, using signal 114 to indicate the tag's location. For example, the tag 104 can provide the location code and a tag identity within the signal 114. In a further example, the signal 114 can include other data received from the beacon device 102, such as sensor data. The signal 114 can be an IR signal or an RF signal. In particular, the signal 114 is transmitted as an RF signal to an antenna 106. The antenna 106 is in communication with a central system 108 that tracks the location of the tag 104.

Figure 2:
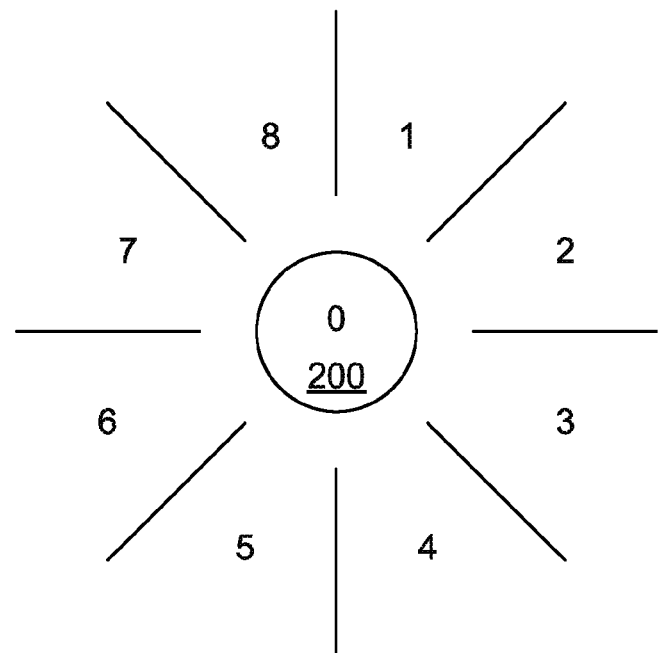
FIG. 2 includes an illustration of an exemplary beacon device.

In general, the beacon device can be configured to transmit a signal in one or more of a plurality of directions. As illustrated in FIG. 2, a beacon device 200 can be configured to transmit a signal in one or more of nine directions including eight approximately radial directions (1-8) and a perpendicular direction (0). While the exemplary beacon device 200 is illustrated as including nine directions, a beacon device can be designed to selectively transmit in one or more of two directions, three directions, or four directions. For example, the beacon device can be designed to transmit in one or more of at least five directions, such as at least six directions, at least seven directions, or even at least eight directions or more.

In the illustrated beacon device 200, the regions (1-8) have an approximately radial direction. An approximately radial direction can include a vector having a radial component, as well as a vertical component. For example, a ceiling mounted device can project down from the ceiling at an angle causing a transmitted signal to propagate in a vector that has both a radial component and a downward vertical component. Alternatively, a unit mounted on other surfaces can include more or less of the radial or vertical components.

In particular, the beacon device 200 can selectively transmit in one or more of the designated directions. For example, if other equipment that communicates using infrared communication methods were located in directions 6 and 7, the beacon device 200 can be configured to transmit in directions 0-5 and 8. In another embodiment, if a region associated with the location code associated with the beacon device 200 were in a direction associated with directions 1 and 2, the beacon device 200 can be configured to transmit in directions 1 and 2 at the exclusion of other directions. Furthermore, more complex patterns can be envisaged, such as the selection of directions 1, 3 and 5 at the exclusion of others.

In an additional embodiment, the beacon device 200 can be configured to transmit a signal that includes a first location code in a first set of directions and a second location code in a second set of directions. In particular, the beacon device can be configured to transmit any number of location codes in various patterns associated with the selectable regions. For example, in the illustrated embodiment of FIG. 2, a beacon device 200 can be configured to transmit a first signal including a first location code in directions 1-4 and a second signal including a second location code in directions 5-8. In such a manner, a tag located in a first direction may receive a different location code than a tag located in a second direction. In a system in which the tag communicates the location code it receives, a tag located in a first direction from a beacon device 200 receives and communicates a different location code than a tag located in a second direction from the beacon device 200.

As a result of selecting particular directions in which to transmit a signal, the beacon device is configured to illuminate in an illumination pattern. An illumination pattern is a volume or an area impinged by a signal to the exclusion of other volumes and areas that can be selected for transmission through the beacon device.

In a particular embodiment, the beacon device selectively transmits a signal in a selected direction by selectively activating illumination sources in proximity to a prismatic structure. A signal emanating from the selected illumination sources impinges the prismatic structure and is directed in a desired direction. For example, FIG. 3 includes an illustration of the cross-section of an exemplary beacon device 300. The beacon device 300 includes a printed circuit board 302 to which sets of illumination sources 306 and 308 are coupled. In addition, the beacon device 300 includes a window 304 from which a prismatic structure 310 extends. The window 304 is transparent to beacon signals and while the window 304 is illustrated as the entire outer casing, the outer casing may alternatively define a set of window portions that are transparent to the beacon signal while the outer casing may or may not be transparent. The prismatic structure 310 can be a single prismatic element extending, for example, in a curve from a planar view. Alternatively, the prismatic structure 310 can include more than one prismatic elements providing similar functionality to a single prismatic element.

In the embodiment illustrated in FIG. 3, the window 304 includes a convex outer surface 312 and a concave inner portion 314 when viewed from a cross-sectional prospective. The prismatic structure 310 extends from the concave inner portion 314 toward the printed circuit board 302. While the prismatic structure 310 can include various cross-sectional shapes, the illustrated prismatic structure 310 is triangular in cross-section and includes two surfaces 316 and 318 between a surface of the concave inner portion 314 and a point.

In an example, the surfaces 316 and 318 of the prismatic structure 310 are substantially flat when viewed from a cross-sectional prospective. Alternatively, the surfaces 316 or 318 can include a slight convex or concave curvature. In particular, the dimensions, including the shape of the surfaces 316 and 318 and relative angles of incidence, redirect a signal emanating from an illumination source, while limiting internal reflection of the signal within the window 304.

Figure 10:
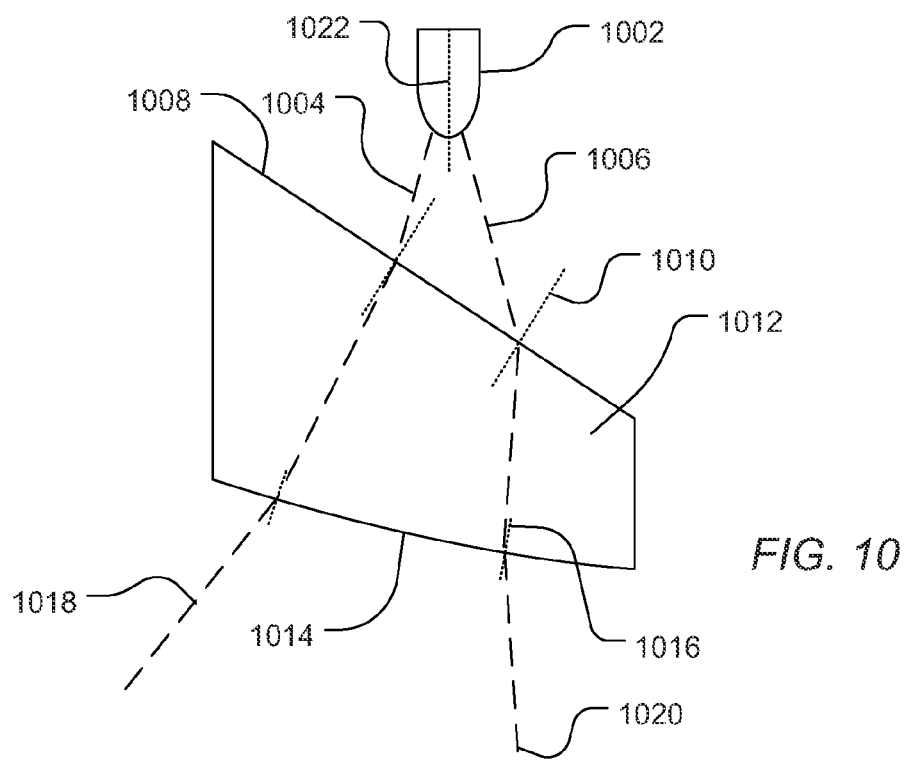
FIG. 10 includes an illustration of an exemplary prismatic structure.

For example, as illustrated in FIG. 10, an illumination source 1002 projects electromagnetic radiation carrying a signal in a beam characterized by beam edges 1004 and 1006. The beam is incident on a surface 1008 of a prismatic structure 1012 at an incidence angle relative to a normal vector 1010 of the surface 1008. Given the spread of the beam, typically within 20° of a centerline 1022 of the illumination source 1002, such as within 15° or within 10°, the angle of incidence of the beam changes across the beam, as illustrated by the incidence of beam edges 1004 and 1006. The angle at which the beam propagates through the prismatic structure 1012 to impinge the surface 1014 of the prismatic structure 1012 approximates that determined by Snell's law. The angle of the beam exiting the prismatic structure 1012 from the surface 1014 also approximates that determined by Snell's law.

As illustrated, the surface 1014 is a convex curved surface and as a result, the direction of the normal vector 1016 changes along the surface. As a result, the curvature has the effect of further spreading the beam, as illustrated by refracted beam edges 1018 and 1020. Alternatively, the surface 1014 can be flat or concave. In an example, a concave surface can act to focus the beam. Accordingly, the shape and relative position of the surfaces 1008 and 1014 can be formed to provide the desired direction and spread of a beam emanating from an illumination source 1002. In particular, the shape and relative position of the surfaces 1008 and 1014 can be formed to provide incident angles at the surface 1014 of the beam, including the beam edges 1004 and 1006, of not greater than 45°, such as not greater than 42°, not greater than 40°, or even not greater than 38°.

Returning to FIG. 3, the illumination sources 306 and 308 can extend substantially perpendicular to the printed circuit board 302 and extend in proximity to the surfaces 316 and 318 of the prismatic structure 310 when viewed in cross-section. Substantially perpendicular indicates that the directional illumination sources predominantly direct the signal emanating from the sources in a direction within 45° of perpendicular to the printed circuit board 302, such as a direction within 30° of perpendicular, within 20° of perpendicular, or even within 15° of perpendicular to printed circuit board 302. Substantially parallel indicates that the illumination source predominantly directs a signal in a direction within 45° of parallel to the printed circuit board 302, such as within 30°, within 20° of parallel, or even within 15° of parallel to the printed circuit board 302. As illustrated, a set of illumination sources 306 extends in proximity to one side of the prismatic structure 310, such as the right side when viewed from a cross-sectional perspective. In another example, a set of illumination sources 308 extend in proximity to the left side of the prismatic structure 310 when viewed from the cross-sectional perspective.

In operation, selective illumination of one of the sets (306 or 308) results in the signal emanating from the illumination sources being directed toward one side or the other of the beacon device 300. For example, selective illumination of the set 306 of illumination sources results in a signal being transmitted in a direction towards the left side of the beacon device 300 when viewed in cross-section. Alternatively, selection of the set 308 of illumination sources results in a signal being directed towards the right of the beacon device 300 when viewed in cross-section.

Figure 11:
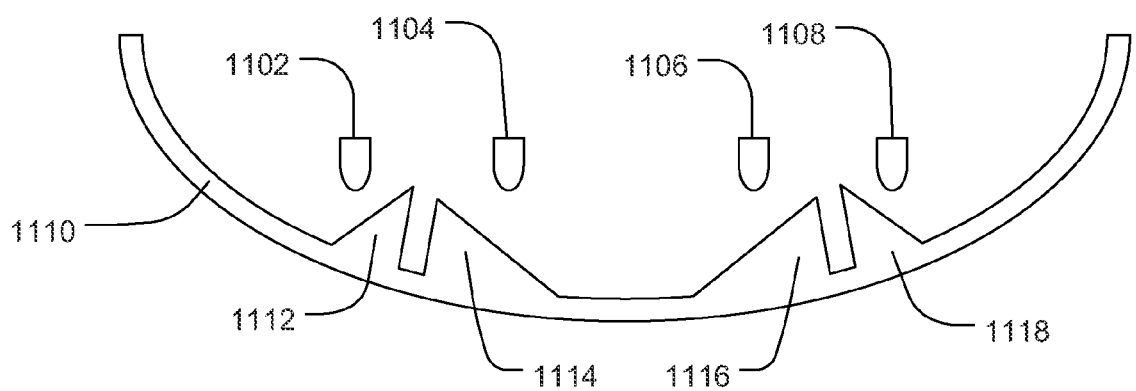
FIG. 11 includes an illustration of an exemplary prismatic system.

In effect, the prismatic structure 310 acts as two prisms, one associated with refraction of signals emanating from an illumination source of the set 308 of illumination sources and one associated with refraction of signals emanating from an illumination source of the set 306 of illumination sources. Alternatively, separate prismatic structures can be associated with illumination sources, each prismatic structure and illumination source pair refracting a signal in a particular direction. For example, as illustrated in FIG. 11, a window 1110 can be provided with prismatic structures 1112, 1114, 1116, or 1120. One or more illumination sources (e.g., illumination sources 1102, 1104, 1106, or 1108) can be associated with one or more of the prismatic structures 1112, 1114, 1116, or 1120. In a particular example, an illumination source is paired with a prism. For example, the illumination source 1102 is paired with the prismatic structure 1112, the illumination source 1104 is paired with the prismatic structure 1114, the illumination source 1106 is paired with the prismatic structure 1116, and the illumination source 1108 is paired with the prismatic structure 1118. While FIG. 11 illustrates the illumination sources and prismatic structures as being symmetric and uniformly patterned, alternative embodiments include illumination sources and prismatic structures that are disposed in asymmetric positions or non-uniform positions, depending on the desired options for projecting signals. For example, the beacon device can take the form of a ¼ sphere or ⅛ sphere and can be disposed in a corner of the room such as where one or more walls meet the ceiling.

Returning to FIG. 3, the beacon device 300 also includes illumination sources 320 and 322 that are directed in a substantially parallel direction. When activated in concert with one of the sets 306 or 308 of the illumination sources, the illumination sources 320 or 322 can provide further coverage of the signal in a particular direction. For example, the set 306 of illumination sources can be activated in conjunction with the illumination source 320 to direct a signal towards the left of the beacon device when viewed in cross-section. In another example, the set 308 of illumination sources can be activated in concert with the illumination source 322 to direct a signal towards the right of the beacon device 300 when viewed in cross-section.

While FIG. 3 illustrates a particular embodiment of the cross-section of a beacon device 300, the beacon device 300 can include other sets of illumination sources in proximity to the prismatic structure 310 that when illuminated direct a signal in a direction not readily illustrated in the cross-section of FIG. 3.

In a particular embodiment, the window 304 is formed of a refractive material, in particular a material with an index of refraction of greater than 1.0. For example, the window 304 can be formed of a polymeric or ceramic material having an index of refraction of at least 1.3 for infrared wavelengths, such as at least 1.4, or even at least 1.5. In an example, the window 304 is formed of a polymeric material, such as a polyolefin, for example polyethylene or polypropylene, a polycarbonate, poly vinyl chloride, acrylic polymer, polystyrene, styrene acrylonitrile copolymer, methylmethacrylate-stryrene copolymer, or any combination thereof. In another example, the window 304 is formed of a ceramic material, such as silica glass, silicaborate glass, sapphire, or a combination thereof.

Figure 4:
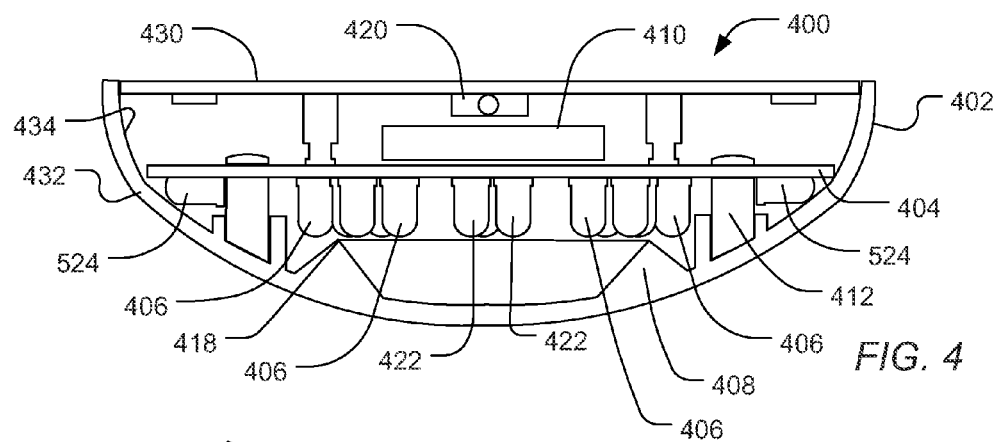
Figure 5:
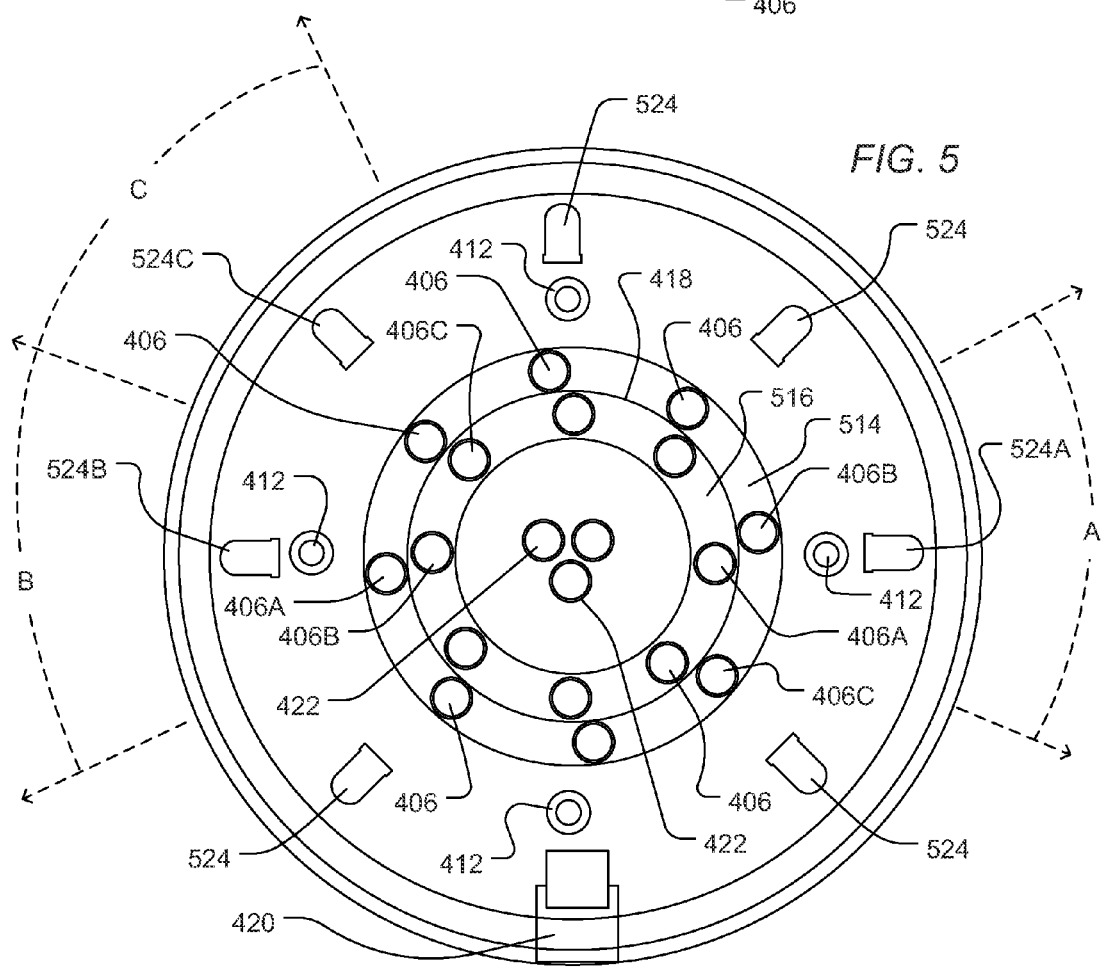

In a further exemplary embodiment, FIG. 4 and FIG. 5 include an illustration of a beacon device 400. The beacon device 400 includes a cover or window 402 and a printed circuit board 404. The cover 402 and printed circuit board 404 are secured to a backing or mount 430. The cover 402 is formed of a material translucent to electromagnetic frequencies useful in transmitting signals, such as IR or RF transmissions. In an example, the cover 402 defines an external curved and convex surface 432 and defines a predominantly concave inner portion 434. In addition, the cover 402 defines a prismatic structure 408 extending from the inner portion 434 toward the printed circuit board 404.

In the illustrated example, the prismatic element 408 has a triangular cross-section and terminates at an upper point 418. When viewed from a planar perspective (FIG. 5), the termination point 418 forms a circular ridge. As illustrated in FIG. 5, the prismatic structure 408 defines two surfaces 514 and 516. From the planar view, the surface of 514 defines an outer surface of the prismatic structure 408 and surface 516 defines an inner surface of the prismatic structure 408. While prismatic structure 408 is illustrated as a single continuous element formed as part of the cover 402, the prismatic structure 408 can be subdivided into more than one element, which may or may not be part of or integral with the cover 402.

In a particular embodiment, each of the surfaces 514 and 516 define a frustoconical shape. In particular, the surface 514 defines a frustoconical shape having a small end closer to the printed circuit board 404 and the surface 516 defines a frustoconical shape having a larger end in closer proximity to the printed circuit board 404.

The printed circuit board 404 includes or is connected to a control circuitry (not illustrated) and optionally memory (not illustrated). In addition, a set of illumination sources 406 are connected to and extend from the printed circuit board 404. The controlled circuitry is in communication with the illumination sources 406 and is configured to transmit signals via the illumination sources 406. Alternatively, the control circuitry or memory may be located outside of the beacon device 400, such as at a host device that controls the actions of the beacon device 400. For example, parameters associated with the control of the illumination sources 406 may be stored in memory outside of the deacon device 400. In particular, the illumination sources 406 extend substantially perpendicular to the printed circuit board 404 toward the inside surface of the cover 402 and terminate proximal to the prismatic structure 408.

In addition, the printed circuit board 404 can be connected to a set of illumination sources 422 disposed within the ring defined by the ridge 418 of the prismatic structure 408, yet not disposed in proximity to a surface 514 or 516 of the prismatic structure 408. As such, the set of illumination sources 422 can form a central grouping of illumination sources at a center of the beacon device 400 from a planar view, which transmits in a substantially perpendicular direction from a cross-sectional perspective. Further, a set of horizontally directed illumination sources 524 can be connected to the printed circuit board 404, as illustrated in FIG. 5. Both the central set 422 of illumination sources and the horizontally directed illumination sources 524 can be selectively controlled by the control circuitry (not illustrated).

Further, the printed circuit board can be coupled to a power source (not illustrated). The power source can be a self-contained power source, such as a battery power source, or an external power source, such as a connection to line power. Further, a communication port 420 can be coupled to the printed circuit board 404 and in communication with the control circuitry (not illustrated). The port 420 can be provided to form a physical connection with the control circuitry and the printed circuit board 404. Alternatively, a wireless communications port can be provided, such as an IR port or a radio frequency transceiver.

In another example, the printed circuit board can include or be coupled to another data source. For example, the beacon device 400 can include a sensor or be in communication with a sensor or other data generating device. In a particular example, the sensor can include a temperature sensor. In another example, the sensor can include an oxygen sensor. The beacon device 400 can transmit in a signal the data, such as sensor data, separately or in conjunction with a location code to a tag device. While the discussion herein refers to transmitting location codes, other data, such as sensor data can also be transmitted. In a particular example, the beacon device 400 can transmit a location code and sensor data, such as a room oxygen level.

In a further embodiment, the beacon device 400 can include a tag 410 positioned to detect the activity of the beacon device 400. When the beacon device 400 is performing as expected, the tag 410 can detect the location signal and provide a status of the beacon device 400 to a monitoring system, such as through communicating the location and a tag identification to a central system. In another example, additional data, such as sensor data, received from the beacon device 400 can be transmitted by the tag 410. In the event that the beacon device is faulty or inoperable, the tag 410 indicates the fault to the central system.

In operation, the beacon device 400 can be configured to selectively transmit a signal, such as a location signal or other data using a subset of the illumination sources (406, 422, or 424). In a particular example, each direction can be addressed using a subset of the illumination sources. For example, each subset can include an illumination source disposed in proximity to the outside surface 514 of the prismatic structure 408 and an illumination source disposed in proximity to an inside surface 516 of the prismatic structure 408. Optionally, the subset can include a horizontally directed illumination source.

For example, to transmit a signal in a direction A, the subset 406A of illumination sources is selectively activated to transmit the signal. Optionally, the subset includes a horizontally directed illumination source 524A. To transmit in an opposite direction B, a subset of illumination sources 406B is selectively illuminated. In addition, a horizontal illumination source 524B is illuminated in conjunction with the subset 406B to transmit a signal in the direction B. To transmit in a different direction, for example direction C, a subset of illumination sources 406C is selected and a horizontal illumination source 524C is selected. To illuminate more than one direction, more than one subset, such as subset 406B and 406C, can be illuminated in concert. To transmit in a direction perpendicular to the printed circuit board 404, the set 422 of illumination sources is activated. As such, one or more of the subsets of illumination sources can be activated to illuminate a defined illumination pattern. In a particular example, the illumination pattern can be defined by a pattern code provided to and stored in the memory of the beacon device 400.

In a further example, the control circuitry can control the illumination sources to transmit a signal having a selected signal frequency. For example, a user can specify which signal frequency is to be used. In particular, the user can configure the beacon device 400 to transmit at one or both of two frequencies. In an example, the signals can be transmitted at signal frequencies in the range of 30 kHz to 50 kHZ (e.g., 36 kHz), frequencies in the range of 400 kHz to 500 kHz (e.g., 455 kHz), or a combination thereof.

In a particular embodiment, the control circuitry can select one of several illumination sources connected in series. For example, the illumination sources are light emitting diodes, such as infrared diodes. As illustrated in FIG. 6, a circuitry 600 includes a control circuitry 602. The control circuitry 602 is connected to a diode 604, which is connected to a diode 606, which is connected to a diode 608 in series. The diode 608 is connected to a resistor 610 that is connected to ground 612. In an example, the diode 604 can be positioned proximal to an outer surface of a prismatic structure, the diode 606 can be positioned proximal to an inner surface of the prismatic structure and the diode 608 can be a horizontally directed diode. Accordingly, transmitting a signal using the circuitry 600 results in the signal being transmitted from each of the diodes 604, 606 and 608. The beacon device can includes a plurality of such circuitries connected to a control circuitry, each circuitry being selectable for transmitting signals. Which circuitry is selected, can be defined by a pattern code stored in a memory of the beacon device.

The signal can be transmitted in a direction using a method, such as method 700 illustrated in FIG. 7. The beacon device accesses a pattern code stored on the beacon device, as illustrated at 702. The pattern code is associated with the illumination pattern over which the signal is to be transmitted. For example, the pattern code can define which subsets of illumination sources are to be activated when transmitting the signal. In an embodiment, the pattern code can include a bit associated with each of the activatable illumination source subsets. For example, a pattern code associated with the beacon device of FIG. 2 can include at least 9 bits, such as 16 bits. Each of the subsets of illumination sources that are associated with an illumination direction can be associated with one of the at least 9 bits, such as in a one-to-one correlation. For example, the subset of illumination sources associated with a direction 0 can be associated with a bit 0 of the pattern code. In another example, a subset of sources associated with the direction 1 can be associated with the bit 1 of the pattern code. The value of the bit of the pattern code defines whether that subset is to be activated and used when transmitting a signal. For example, a value of 1 of the bit 0 of the pattern code can indicate that the subset of illumination sources associated with direction 0 is to be activated during transmission.

Once the pattern code has been accessed, the beacon device can transmit a signal in an illumination pattern based on the pattern code, as illustrated at 704. For example, the signal can be transmitted by only those subsets of illumination sources identified as being active by the pattern code. In a particular embodiment, the signal can include a location code that identifies the location of the beacon device or the identity of the beacon device. In another embodiment, the signal can include payload data, such as sensor data.

In embodiments of the beacon device that include a signal detector, such as a built-in signal detector or an associated tag, the detector or tag can detect the transmitted signal emanating from the beacon device, as illustrated at 706. In a particular embodiment in which the beacon is equipped with a transceiver or the tag associated with the beacon device is equipped with a transceiver, the beacon device or tag can transmit a status signal to a central system, as illustrated at 708. In this manner, the central system can determine an operational status of the beacon device.

Figure 8:
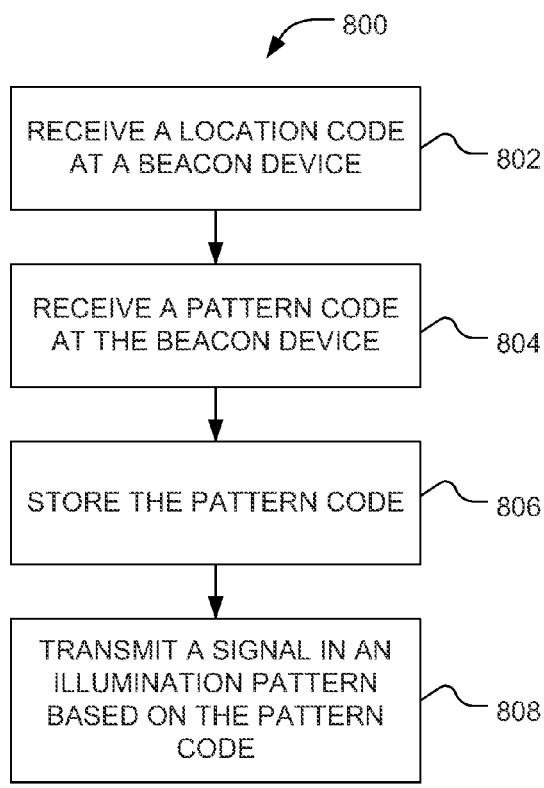
FIG. 8 and FIG. 9 include flow diagrams of exemplary methods for configuring a tracking system.
Figure 9:
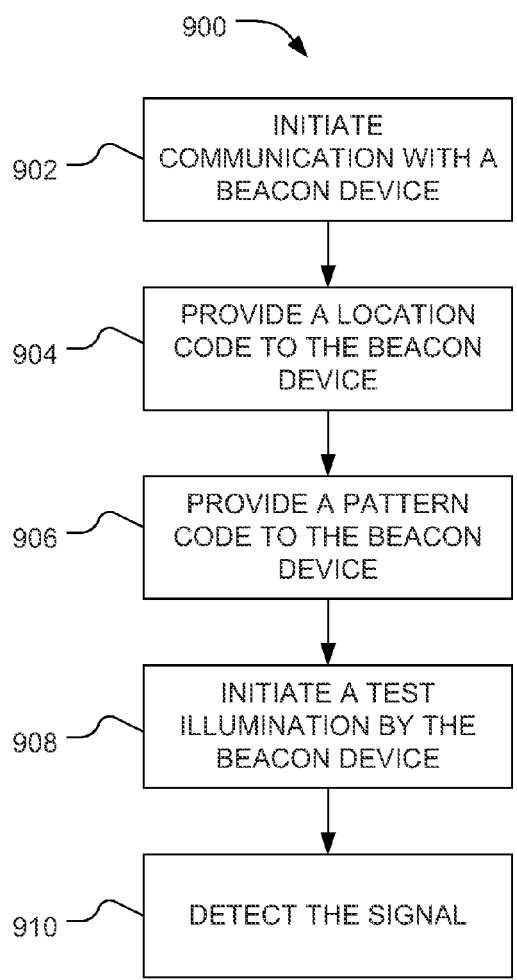

As part of a method to configure the tracking system, the beacon device can be configured, as illustrated in method 800 of FIG. 8 and method 900 of FIG. 9. For example, a beacon device can receive a location code, as illustrated at 802. The location code can be an identifier associated with the location of the installed beacon device or can be an identifier of the beacon device. In one embodiment, the location code is associated with a physical location in a database at a central system. In another embodiment, the location code includes a text indication of the physical location (e.g. "Room 312").

As illustrated at 804, a pattern code can be received at the beacon device and the pattern code can be stored on the beacon device, as illustrated in 806. For example, the pattern code can take the form of a pattern code, as described above in relation to FIG. 7.

Optionally, the beacon device can transmit a signal in an illumination pattern based on the pattern code, as illustrated at 808, to provide confirmation that the correct pattern code was entered. For example, an iterative transmission of a signal and an illumination pattern based on the pattern code and receipt of a new pattern code can be performed until the correct pattern code is entered that results in the desired illumination pattern.

As illustrated in FIG. 9, a method 900 can include initiating communication with a beacon device, as illustrated at 902. For example, a portable device can be plugged into a communication port of a beacon device. In another example, the portable device can include an IR or RF transmitter for communicating with the beacon device.

Once communication has been initiated with the beacon device, the beacon device can be provided with a location code, as illustrated at 904. In an example, the location code can take the form of a location code, as described above in relation to FIG. 8. Further, the beacon device can be provided with a pattern code, as illustrated at 906. The pattern code, for example, can take the form of the pattern codes described above in relation to FIG. 7.

Further, a test illumination can be initiated in the beacon device to provide illumination in the pattern designated by the pattern code, as illustrated at 908. The portable device can detect the signals issued from the beacon device in the illumination pattern to determine whether the desired illumination pattern has been implemented, as illustrated at 910.

In a further embodiment, the beacon device may include a receiver, such as an infrared receiver to detect signals from other beacon devices. For example, the beacon device may detect signals of other beacon devices and coordinate transmission of signals in time to avoid signal collisions. The other beacon devices may be structurally similar to the beacon devices described above. In another example, the beacon device may detect signals and mimic the location code to effectively expand the area of coverage associated with a location code. Further, the beacon device may perform both functions separately or in concert.

Particular embodiments of the above described tracking system, beacon device, and methods provide particular technical advantages. For example, embodiments of the beacon device are more easily assembled with less error in the direction of signal transmission than prior art devices. In particular, embodiments of the beacon device have no moving parts. In addition, the beacon device is easily reconfigured. In embodiments configurable for transmission in more than two directions, transmissions can be directed in asymmetric patterns. Such asymmetric patterns can permit the exclusions of a small number of directions while transmitting or can permit transmission in a narrow set of directions, a single device being configurable for either situation.

In a particular embodiment, a beacon device includes a control circuitry, a window, and a plurality of sets of illumination sources. The window includes a prismatic structure forming a ring from a planar perspective. The prismatic structure defines an inside surface and an outside surface from the planar perspective. The plurality of sets of illumination sources are coupled to the control circuitry. Each set of illumination sources includes a first illumination source disposed proximal to the inside surface of the prismatic structure and includes a second illumination source disposed proximal to the outside surface of the prismatic structure. The control circuitry is to illuminate a first set of the plurality of sets of illumination sources to transmit a signal in a first direction.

In an example, the control circuitry is to illuminate a second set of the plurality of sets of illumination sources to transmit the signal in a second direction. In a further example, the control circuitry is to illuminate a third set of the plurality of sets of illumination sources to transmit the signal in a third direction.

In another example, the beacon device further includes a memory storing a pattern code. The control circuitry is to transmit the signal via a subset of the plurality of sets of illumination sources selected based on the pattern code. The memory can further store a location code. The signal includes the location code.

In a further example, the illumination sources are infrared illumination sources. Each set of the plurality of sets of illumination sources can further include a third illumination source disposed away from the prismatic structure and pointed in a direction associated with the each set. For example, the first and second illumination sources extend substantially perpendicular and the third illumination source is substantially parallel.

In an additional example, the beacon device can further include a central set of illumination sources disposed at a location central to the ring formed by the prismatic structure.

Each illumination source of the central set is pointed in a direction substantially perpendicular to the planar perspective.

In another example, the inside surface is substantially flat from a cross-sectional perspective. The outside surface is substantially flat from a cross-sectional perspective. In a particular example, the inside surface forms a frustoconical shape. The outside surface forms a frustoconical shape.

In an example, the window includes an exterior surface. The outside surface is disposed at an angle relative to the exterior surface to provide the signal at an incident angle relative to a normal vector of the exterior surface that is not greater than 45°. In particular, the incident angle is not greater than 42°. In another example, the window includes an exterior surface. The inside surface is disposed at an angle relative to the exterior surface to provide the signal at an incident angle relative to a normal vector of the exterior surface that is not greater than 45°. In particular, the incident angle is not greater than 42°.

In a further example, the beacon device further includes a printed circuit board connected to the control circuitry and the plurality of sets of illumination sources. The illuminations devices extend substantially perpendicular to the printed circuit board.

In another embodiment, a tracking system includes an tracking tag and a beacon device to communicate a location to the tracking tag via a signal. The beacon device includes a control circuitry, a window, and a plurality of sets of illumination sources. The window includes a prismatic structure forming a ring from a planar perspective. The prismatic structure defines an inside surface and an outside surface from the planar perspective. The plurality of sets of illumination sources are coupled to the control circuitry. Each set of illumination sources includes a first illumination source disposed proximal to the inside surface of the prismatic structure and includes a second illumination source disposed proximal to the outside surface of the prismatic structure. The control circuitry is to illuminate a first set of the plurality of sets of illumination sources to transmit the signal in a first direction.

In an example, the tracking system further includes a central system. The tag is to receive the signal and to communicate the location to the central system.

In an additional embodiment, a beacon device includes circuitry to initiate transmission of a signal via illumination sources, a first set of the illumination sources, a second set of the illumination sources, and a window having a convex outer surface and a concave inner surface and including a prism structure extending from the concave inner surface. The first set of illumination sources are disposed on a first side of the prism from a cross-sectional perspective and the second set of illumination sources are disposed on a second side of the prism from a cross-sectional perspective. The circuitry is to initiate transmission of the signal in a first direction using the first set of the illumination sources or is to initiate transmission of the signal in a second direction using the second set of illumination sources.

In an example, the beacon device further includes a memory storing a pattern code. The control circuitry is to transmit the signal via the first set or the second set of illumination sources based on the pattern code. In another example, the memory stores a location code. The signal includes the location code. In an additional example, signal can include payload data. For example, the signal can include sensor data.

In a further example, the illumination sources comprises infrared illumination sources. In an additional example, the first set of the of illumination sources further includes a third illumination source disposed away from the prismatic structure and pointed in the first direction.

In an additional example, the beacon device further includes a central set of illumination sources disposed at a location central to the prismatic structure. Each illumination source of the central set are pointed in a direction substantially perpendicular.

In an example, the convex outer surface is disposed at an angle relative to the first side of the prismatic structure to provide the signal at an incident angle relative to a normal vector of the convex outer surface that is not greater than 45°. For example, the incident angle can be not greater than 42°.

In an additional embodiment, a tracking system includes a tracking tag and a beacon device to communicate a location to the tracking tag via a signal. The beacon device includes circuitry to initiate transmission of the signal via illumination sources, a first set of the illumination sources, a second set of the illumination sources, and a window having a convex outer surface and a concave inner surface and including a prism structure extending from the concave inner surface. The first set of illumination sources is disposed on a first side of the prism from a cross-sectional perspective and the second set of illumination sources is disposed on a second side of the prism from a cross-sectional perspective. The circuitry is to initiate transmission of the signal in a first direction using the first set of the illumination sources or is to initiate transmission of the signal in a second direction using the second set of illumination sources. In an example, the beacon device further includes a central system. The tag is to receive the signal and is to communicate the location to the central system.

In another embodiment, a method of installing a tracking system includes initiating communication with a beacon device and providing a pattern code to the beacon device. The beacon device is to transmit a signal in an illumination pattern associated with the pattern code. In an example, the beacon device includes a set of illumination sources disposed in proximity to a prism and the method further includes illuminating a subset of the set of illumination sources based on the pattern code. In an additional example, the method further includes providing a location code to the beacon device. The beacon device is to provide a signal including the location code in the illumination pattern associated with the pattern code.

In another example, the method further includes detecting the signal to determine the illumination pattern.

In a further embodiment, a method of installing a tracking system includes receiving a pattern code at a beacon device. The beacon device includes a set of illumination sources. The method further includes transmitting a signal using a subset of the set of illumination sources based on the pattern code. The subset transmits the signal in an illumination pattern. In an example, the method further includes storing a location code, wherein transmitting the signal includes transmitting a signal including the location code. In a further example, transmitting the signal includes transmitting payload data, such as data from a sensor. In an additional example, the method further includes receiving the location code or the payload data.

In an additional embodiment, a method of providing a beacon signal includes accessing a pattern code on a beacon device. The beacon device includes a plurality of illumination sources disposed in proximity to a prismatic structure. The method further includes transmitting a signal via a subset of the plurality of illumination sources selected based on the pattern code.

In a further embodiment, a beacon device includes a control circuitry, a first illumination source connected to the control circuitry and to emit electromagnetic radiation along a first centerline, a second illumination source connected to the control circuitry and to emit electromagnetic radiation along a second centerline, the first and second centerlines being parallel, a first prismatic structure disposed to refract the electromagnetic radiation of the first illumination source in a first direction, and a second prismatic structure disposed to refract the electromagnetic radiation of the second illumination source in a second direction. The control circuitry is to initiate transmission of a signal via the first or the second illumination sources. The signal includes an indication of location or payload data. In an example, the indication of location includes a location code.

In an example, the beacon device further includes a memory to store a pattern code. The control circuitry selectively initiates transmission of the signal via the first or the second illumination sources based on the pattern code.

In another example, the first and second prismatic structures are associated with a window. The window includes an outer surface. The outer surface of the window can be disposed relative to incident surfaces of the first prismatic structure to form an incident angle relative to a normal vector of the outer surface that is not greater than 45°. The outer surface of the window can be disposed relative to incident surfaces of the second prismatic structure to form an incident angle relative to a normal vector of the outer surface that is not greater than 45°.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A beacon device comprising:
   circuitry to initiate transmission of a signal via illumination sources;
   a first set of the illumination sources;
   a second set of the illumination sources; and
   a window having a convex outer surface and a concave inner surface and including a prismatic structure extending from the concave inner surface, the first set of illumination sources disposed on a first side of the prismatic structure from a cross-sectional perspective and the second set of illumination sources disposed on a second side of the prismatic structure from a cross-sectional perspective, the circuitry to initiate transmission of the signal in a first direction using the first set of the illumination sources or to initiate transmission of the signal in a second direction using the second set of illumination sources.

2. The beacon device of claim 1, further comprising a memory storing a pattern code, the control circuitry to transmit the signal via the first set or the second set of illumination sources based on the pattern code.

3. The beacon device of claim 1, further comprising a location code, the signal to include the location code.

4. The beacon device of claim 1, wherein the illumination sources comprises infrared illumination sources.

5. The beacon device of claim 1, wherein the first set of the of illumination sources further comprises a third illumination source disposed away from the prismatic structure and pointed in the first direction.

6. The beacon device of claim 1, further comprising a central set of illumination sources disposed at a location central to the prismatic structure, each illumination source of the central set pointed in a direction substantially perpendicular.

7. The beacon device of claim 1, wherein the convex outer surface is disposed at an angle relative to the first side of the prismatic structure to provide the signal at an incident angle relative to a normal vector of the convex outer surface that is not greater than 45°.

8. The beacon device of claim 7, wherein the incident angle is not greater than 42°.

9. A tracking system comprising:
   a tracking tag; and
   a beacon device to communicate a location to the tracking tag via a signal, the beacon device comprising:
   circuitry to initiate transmission of the signal via illumination sources;
   a first set of the illumination sources;
   a second set of the illumination sources; and
   a window having a convex outer surface and a concave inner surface and including a prismatic structure extending from the concave inner surface, the first set of illumination sources disposed on a first side of the prismatic structure from a cross-sectional perspective and the second set of illumination sources disposed on a second side of the prismatic structure from a cross-sectional perspective, the circuitry to initiate transmission of the signal in a first direction using the first set of the illumination sources or to initiate transmission of the signal in a second direction using the second set of illumination sources.

10. The tracking system of claim 9, further comprising a central system, the tracking tag to receive the signal and to communicate the location to the central system.

11. The tracking system of claim 9, further comprising a central set of illumination sources disposed at a location central to the prismatic structure, each illumination source of the central set pointed in a direction substantially perpendicular.

* * * * *